(12) United States Patent
Sercel et al.

(10) Patent No.: US 12,025,006 B2
(45) Date of Patent: *Jul. 2, 2024

(54) SYSTEMS AND METHODS FOR RADIANT GAS DYNAMIC MINING OF PERMAFROST

(71) Applicant: Trans Astronautica Corporation, Lake View Terrace, CA (US)

(72) Inventors: Joel C. Sercel, Lake View Terrace, CA (US); Philip J. Wahl, Altadena, CA (US); Craig E. Peterson, Los Angeles, CA (US); James G. Small, Sonoita, AZ (US)

(73) Assignee: Trans Astronautica Corporation, Lake View Terrace, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,885

(22) Filed: Jan. 26, 2023

(65) Prior Publication Data

US 2023/0279776 A1 Sep. 7, 2023

Related U.S. Application Data

(63) Continuation of application No. 17/448,349, filed on Sep. 21, 2021, now Pat. No. 11,566,521.

(Continued)

(51) Int. Cl.
*E21C 51/00* (2006.01)
*B01D 7/00* (2006.01)
(Continued)

(52) U.S. Cl.
CPC ............... *E21C 51/00* (2013.01); *B01D 7/00* (2013.01); *B64G 1/16* (2013.01); *H05B 6/72* (2013.01)

(58) Field of Classification Search
CPC .... H05B 6/72; B64G 1/16; B01D 7/00; E21C 51/00
See application file for complete search history.

(56) References Cited

U.S. PATENT DOCUMENTS

| 1,964,189 A | * | 6/1934 | Koomans | H01Q 21/062 343/813 |
| 2,930,187 A | | 3/1960 | Chillson | |

(Continued)

FOREIGN PATENT DOCUMENTS

| AU | 2007200666 A1 | 8/2007 |
| CN | 103075816 | 5/2013 |

(Continued)

OTHER PUBLICATIONS https://www.antenna-theory.com/tutorial/txline/transmissionline.php "transmission lines" accessed Aug. 10, 2023 (Year: 2015).*

(Continued)

*Primary Examiner* — Janine M Kreck
(74) *Attorney, Agent, or Firm* — Knobbe, Martens, Olson & Bear, LLP

(57) ABSTRACT

Systems and apparatus are disclosed for mining the permafrost at the landing sites using radiant gas dynamic mining procedures. The systems can comprise a rover vehicle with an integrated large area dome for cryotrapping gases released from the surface and multi-wavelength radiant heating systems to provide adjustable heating as a function of depth. Various antenna arrays and configurations are disclosed, some of which can cooperate for a specific aiming or targeting effect.

20 Claims, 6 Drawing Sheets

Related U.S. Application Data

(60) Provisional application No. 63/081,836, filed on Sep. 22, 2020.

(51) Int. Cl.
*B64G 1/16* (2006.01)
*H05B 6/72* (2006.01)

(56) References Cited

U.S. PATENT DOCUMENTS

| | | |
|---|---|---|
| 2,945,234 A | 7/1960 | Driscol |
| 2,975,592 A | 3/1961 | Fox |
| 2,991,617 A | 7/1961 | Nerad |
| 3,063,521 A | 11/1962 | Fuller |
| 3,064,418 A | 11/1962 | Sanders |
| 3,202,998 A | 8/1965 | Hoffman |
| 3,564,253 A | 2/1971 | Buckingham |
| 3,597,923 A | 8/1971 | Simon |
| 3,606,211 A | 9/1971 | Roersch et al. |
| 4,013,885 A | 3/1977 | Blitz |
| 4,073,138 A | 2/1978 | Beichel |
| 4,122,239 A | 10/1978 | Riboulet |
| 4,135,489 A | 1/1979 | Jarvinen |
| 4,286,581 A | 1/1981 | Atkinson, Jr. |
| 4,263,895 A | 4/1981 | Colao |
| 4,449,514 A | 5/1984 | Selcuk |
| 4,459,972 A | 7/1984 | Moore |
| 4,480,677 A | 11/1984 | Henson et al. |
| 4,528,978 A | 7/1985 | Robinson |
| 4,564,275 A | 1/1986 | Stone |
| 4,781,018 A | 11/1988 | Shoji |
| 4,815,443 A | 3/1989 | Vrolyk |
| 4,932,910 A | 6/1990 | Hayday |
| 5,014,131 A | 5/1991 | Reed et al. |
| 5,047,654 A | 9/1991 | Newman |
| 5,104,211 A | 5/1992 | Schumacher et al. |
| 5,138,832 A | 8/1992 | Pande |
| 5,202,541 A | 4/1993 | Patterson |
| 5,266,762 A | 11/1993 | Hoffman |
| 5,305,970 A | 4/1994 | Porter et al. |
| 5,459,996 A | 10/1995 | Malloy, III |
| 5,511,748 A | 4/1996 | Scott |
| 5,593,549 A | 1/1997 | Stirbl et al. |
| 5,674,794 A | 10/1997 | Chatterjee |
| 5,751,895 A | 5/1998 | Bridges |
| 5,861,947 A | 1/1999 | Neumann |
| 5,982,481 A | 11/1999 | Stone |
| 6,052,987 A | 4/2000 | Dressler |
| 6,057,505 A | 5/2000 | Ortabasi |
| 6,193,193 B1 | 2/2001 | Sorrano |
| 6,290,185 B1 | 9/2001 | DeMars |
| 6,343,464 B1 | 2/2002 | Westerman |
| 6,350,973 B2 | 2/2002 | Wroe |
| 6,532,953 B1 | 3/2003 | Blackmon et al. |
| 6,669,148 B2 | 12/2003 | Anderman et al. |
| 6,742,325 B2 | 6/2004 | Kudija, Jr |
| 7,207,327 B2 | 4/2007 | Litwin |
| 7,387,279 B2 | 6/2008 | Anderman et al. |
| 7,575,200 B2 | 8/2009 | Behrens et al. |
| 7,594,530 B1 | 9/2009 | Tucker |
| 7,823,837 B2 | 11/2010 | Behrens et al. |
| 7,997,510 B2 | 6/2011 | Pavia et al. |
| 8,033,110 B2 | 10/2011 | Gilon et al. |
| 8,357,884 B1 | 1/2013 | Ethridge |
| 8,379,310 B2 | 2/2013 | Mori et al. |
| 9,010,317 B1 | 4/2015 | Gross |
| 9,187,191 B1 | 11/2015 | Jensen et al. |
| 9,222,702 B2 | 12/2015 | Goldberg |
| 9,266,627 B1 | 2/2016 | Anderson |
| 9,409,658 B1 | 8/2016 | Diamandis et al. |
| 9,581,021 B2 | 2/2017 | Ethridge |
| 9,676,499 B2 | 6/2017 | Myers et al. |
| 9,709,771 B2 | 7/2017 | Corrigan |
| 10,032,285 B1 | 7/2018 | Ma |
| 10,445,862 B1 | 10/2019 | Merry et al. |
| 10,654,596 B1 | 5/2020 | Eller |
| 10,919,227 B2 | 2/2021 | Cook |
| 10,989,443 B1 | 4/2021 | Sercel et al. |
| 11,085,669 B2 | 8/2021 | Sercel |
| 11,143,026 B2 * | 10/2021 | Sercel ............... E21B 36/04 |
| 11,188,750 B1 | 11/2021 | Ma et al. |
| 11,280,194 B2 | 3/2022 | Sercel |
| 11,391,246 B2 | 7/2022 | Sercel et al. |
| 11,566,521 B2 * | 1/2023 | Sercel ............... E21C 51/00 |
| 11,643,930 B2 | 5/2023 | Sercel |
| 2002/0075579 A1 | 6/2002 | Vasylyev et al. |
| 2002/0184873 A1 | 12/2002 | Dujarric |
| 2003/0029969 A1 | 2/2003 | Turner |
| 2003/0224082 A1 | 12/2003 | Akopyan |
| 2004/0004184 A1 | 1/2004 | Schubert |
| 2004/0231716 A1 | 11/2004 | Litwin |
| 2006/0191916 A1 | 8/2006 | Stephan et al. |
| 2006/0233421 A1 | 10/2006 | Portigal et al. |
| 2007/0128582 A1 | 6/2007 | Anderson et al. |
| 2008/0000232 A1 | 1/2008 | Rogers et al. |
| 2008/0023060 A1 | 1/2008 | Grumazescu |
| 2008/0156315 A1 | 7/2008 | Yangpichit |
| 2009/0293448 A1 | 12/2009 | Grote et al. |
| 2010/0038491 A1 | 2/2010 | Cepollina et al. |
| 2010/0163683 A1 | 7/2010 | Quine |
| 2010/0252024 A1 | 10/2010 | Convery |
| 2010/0269817 A1 | 10/2010 | Kelly |
| 2010/0294261 A1 | 11/2010 | Deforge |
| 2010/0319678 A1 | 12/2010 | Maemura et al. |
| 2011/0031238 A1 | 2/2011 | Segawa |
| 2011/0041894 A1 | 2/2011 | Liao |
| 2011/0127382 A1 | 6/2011 | Im |
| 2011/0185728 A1 | 8/2011 | Meyers et al. |
| 2011/0220091 A1 | 9/2011 | Kroyzer |
| 2011/0315678 A1 | 12/2011 | Furuya |
| 2012/0155966 A1 | 6/2012 | Zillmer |
| 2013/0021471 A1 | 1/2013 | Waterhouse |
| 2013/0206209 A1 | 8/2013 | Lasich |
| 2013/0239952 A1 | 9/2013 | Kroyzer |
| 2014/0138952 A1 | 5/2014 | Marumoto |
| 2014/0150651 A1 | 6/2014 | Velasco Valcke |
| 2014/0174430 A1 | 6/2014 | Fitzgerald et al. |
| 2014/0262278 A1 | 9/2014 | Walton |
| 2014/0318127 A1 | 10/2014 | Kerns |
| 2015/0027102 A1 | 1/2015 | Bahn et al. |
| 2015/0180114 A1 | 6/2015 | Achour |
| 2016/0010442 A1 | 1/2016 | Kearl |
| 2016/0024921 A1 * | 1/2016 | Ethridge ............... H05B 6/72 |
| | | 219/385 |
| 2016/0076792 A1 | 3/2016 | Magaldi |
| 2016/0121395 A1 | 5/2016 | Kawanaka |
| 2016/0300341 A1 | 10/2016 | Hay et al. |
| 2017/0039446 A1 | 2/2017 | Silny et al. |
| 2017/0129579 A1 | 5/2017 | De Jong |
| 2017/0358103 A1 | 12/2017 | Shao et al. |
| 2018/0194626 A1 | 7/2018 | Berggren et al. |
| 2018/0265224 A1 | 9/2018 | Foulds et al. |
| 2019/0271228 A1 | 9/2019 | Sowers, Jr. et al. |
| 2020/0240267 A1 * | 7/2020 | Sercel ............... B64G 4/00 |
| 2021/0061494 A1 | 3/2021 | Belieres Montero |
| 2021/0150253 A1 | 5/2021 | Akagunduz et al. |
| 2021/0333019 A1 | 10/2021 | Sercel et al. |
| 2022/0046612 A1 | 1/2022 | Sercel et al. |
| 2022/0082019 A1 | 3/2022 | Sercel et al. |
| 2022/0089302 A1 | 3/2022 | Sercel et al. |
| 2022/0268524 A1 | 8/2022 | Small |
| 2022/0275721 A1 | 9/2022 | Sercel |
| 2022/0290635 A1 | 9/2022 | Sercel |
| 2023/0130545 A1 | 4/2023 | Sercel |
| 2023/0249848 A1 | 8/2023 | Sercel |
| 2023/0280098 A1 | 9/2023 | Small |
| 2023/0383650 A1 | 11/2023 | Sercel |
| 2023/0399946 A1 | 12/2023 | Sercel |

FOREIGN PATENT DOCUMENTS

| | | |
|---|---|---|
| CN | 109102522 | 12/2018 |
| DE | 102004026517 B3 | 10/2005 |
| EP | 2 177 846 | 4/2010 |

(56) References Cited

FOREIGN PATENT DOCUMENTS

| | | |
|---|---|---|
| EP | 2 195 583 | 3/2013 |
| ES | 2639583 | 10/2017 |
| JP | 2012-038954 | 2/2012 |
| JP | 2019-148155 | 9/2019 |
| RU | 2344973 | 1/2009 |
| RU | 2353775 | 4/2009 |
| WO | WO 16/172647 | 10/2016 |

OTHER PUBLICATIONS https://antenna-theory.com/antennas/dipole.php 7/7 "the dipole antenna" accessed Aug. 10, 2023 (Year: 2015).*

Antarctic Meteorite Sample, Investigator's Guidebook, Astromaterials Research and Exploration Science Directorate KA, Astromaterials Acquisition and Curation Office/KT, JSC-66468, Lyndon B. Johnson Space Center, Houston TX.

Arnold, J.R., "Ice in the lunar polar regions", J. Geophys. Res 84., 1979, pp. 5659-5668.

Badescu, V., "Asteroids: Prospective Energy and Material Resources," Jul. 14, 2013, ISBN-13:978-3642392438.

Binzel, R., "Human Spaceflight: Find Asteroids to get to Mars." Nature 514, 559-561, Oct. 29, 2014.

Bliss, T., et al. "Experimental validation of robust resonance entrainment for cpg-controlled tensegrity structures." IEEE Transactions On Control Systems Technology, 2012, vol. 21(3), pp. 666-678.

Bottke, W.F., et al., Debiased orbital and Absolute Magnitude Distribution of the near-Earth objects, Icarus 156, 399-433, 2002.

Bowersox, Kenneth and NASA Advisory Council Committee on Human Exploration and Operations, "NASA Advisory Council Finding on NASA Human Exploration Strategy," from the Council Public Deliberation, Jul. 31, 2014.

Boyle, A., "Blue Origin Space venture slips in a sneak peek at design of Blue Moon lunar lander", Apr. 5, 2017, https://www.geekwire.com/2017/blue-origin-sneak-peek-blue-moon-lunar-lander/.

Boyle, A., "Jeff Bezos lays out his vision for city on the moon, complete with robots", May 20, 2017,https://www.geekwire.com/2017/jeff-bezos-blue-origin-moon/.

Brophy, J., et al, "Spacecraft Conceptual Design for Returning Entire Near-Earth Asteroids," 48th AIAA/ASME/SAE/ASEE Joint Propulsion Conference & Exhibit and 10th International Energy Conversion Engineering Conference, Atlanta, George Jul. 29-Aug. 1, 2012.

Brown, P., et al., The Flux of small near-Earth objects colliding with the Earth, Nature 420, 294-296, 2002.

Bussey, D. B. J., et al., "Permanent shadow in simple craters near the lunar poles," Geophysical Research Letters, 2003, vol. 30, No. 6, 1278, pp. 11-1-11-4.

Cassapakis, C.G., et al., "A Power Antenna for Deep Space Missions," Solar Engineering Editors: J.H. Davidson and J. Chavez. Book No. HO1046, 1996.

CERUTI, Conceptual Design and Preliminary Structural Analysis of Inflatable Basket for an Asteroid Capturing Satellite; Strojniški vestnik—Journal of Mechanical Engineering 61(2015)5, 341-351 Received for review: Jul. 17, 2014; © 2015 Journal of Mechanical Engineering; DOI: 10.5545/sv-jme.2014.2063; in 11 pages.

Chen, L.H., et al., Soft spherical tensegrity robot design using rod-centered actuation and control, Journal of Mechanisms and Robotics, 2017, vol. 9(2) pp. 025001.

Chen, M., et al., "Energy analysis of growth adaptable artificial gravity space habitat," AIAA SPACE and Astronautics Forum and Exposition, 2018,in 13 pages.

Cohen, Marc M., et al., "Asteroid Mining," AIAA 2013-5304, presented at AIAA SPACE 2013 Conference and Exposition, Sep. 10-12, 2013, San Diego, CA.

Colaprete, A., et al., "Detection of water in the Icross ejecta plume," Science, vol. 330, pp. 463-468, Oct. 22, 2010.

Court, R.W., et al. "Volatile Yields upon Pyrolysis of Carbonaceous Chondrites as Determined by Quantitative Pyrolysis-Fourier Transform Infrared Spectroscopy" presented at the 40th Lunar and Planetary Science Conference, 2009.

Craft, J., et al. "Percussive digging systems for planetary research" IEEE Aerospace and Electronic Systems Magazine, 2010, vol. 25 pp. 21-26.

Crawford, I.A., Lunar resources: A review. Progress in Physical Geography, 39(2):137-167, 2015.

Crusan, J., "an Evolvable Mars Campaign" NASA Presentation, Jul. 2014, available at https://www.nasa.gov/sites/default/files/files/20140429-Crusan-Evolvable-Mars-Campaign.pdf.

David, "Asteroid-Mining Plan Would Bake Water Out of Bagged-Up Space Rocks." Space.com, Sep. 18, 2015 (Sep. 18, 2015), pp. 1-5 [online] <URL: http://www.space.com/3058-asteroid-mining-water-propulsion.html>.

Duke, M., et al., "Mining of lunar polar ice", 36th AIAA Aerospace Sciences Meeting and Exhibit, 1998, pp. 1069.

Ehricke, K.A., "The Solar-Powered Space Ship," ARS Paper 310-56, Jun. 1956.

Eldred, et al., "Alternative Scenarios Utilizing Nonterrestrial Resources", Space Resources Scenarios NASA, 1992.

Erickson, K., "Optimal Architecture for an Asteroid Mining Mission: Equipment Details and Integration" Collection of Technical Papers—Space Conference 2006, Sep. 19-21, 2006, San Jose, California; AIAA 2006-7504; in 17 pages.

Etheridge, F.G., "Solar-Rocket System Concept Analysis", Final Report on AFRPL Contract F04611-79-C-0007, AFRPL-TR-79-79, Rockwell International, Space Systems Group, Downey CA 90241, Nov. 1979.

Ethridge, E. C., et al., "Microwave Extraction of Volatiles for Mars Science and ISRU. Concepts and Approaches for Mars Exploration". Concepts and Approaches for Mars Exploration; Jun. 2012, pp. 2-14, Houston, TX; United States.

FAA 2012 Commercial Space Transportation Forecasts. Available at http://www.faa.gov/about/office_org/headquarters_offices/ast/media/The_Annual_Compendium_of_Commercial_Space_Transporation_2012.pdf.

Fabbrocino, F., et al., "Optimal prestress design of composite cable-stayed bridges". Composite Structures, 2017, vol. 169, pp. 167-172.

Feldman, W. C., et al., (1998). "Fluxes of fast and epithermal neutrons from Lunar Prospector", Evidence for water ice at the lunar poles, science 281, 1998, pp. 1496-1500.

Fincannon, J., "Lunar Polar Illumination for Power Analysis", NASA/TM, 2008- 215446, https://ntrs.nasa.gov/archive/nasa/casi.ntrs.nasa.gov/20080045536.pdf.

Fisher, E.A., et al., "Evidence for surface water ice in the lunar polar regions using reflectance measurements from the Lunar Orbiter Laser Altimeter and temperature measurements from the Diviner Lunar Radiometer Experiment", Lunar Polar Volaties, 2018, LBI Contrib. No. 2087.

Fisher, E.A., et al., "Evidence for surface water ice in the lunar polar regions using reflectance measurements from the Lunar Orbiter Laser Altimeter and temperature measurements from the Diviner Lunar Radiometer Experiment", Icarus 292, 2017, pp. 74.

Freeland, R.E., et al., "Large Inflatable Deployable Antenna Flight Experiment Results," (AF Paper 97-1.3.01, presented at the 48th Congress of the International Astronautical Federation, Turin, Italy, Oct. 6-10, 1997.

Freeland, R.E., et al., "Significance of the Inflatable Antenna Experiment Technology", AIAA-98-2104 published in the 39th AIAA/ASME/ASCE/AHS/ASC Structures, Structural Dynamics, and Materials Conference and Exhibit, Apr. 1998.

Garenne, A.B., et al., "The Abundance and Stability of Water in Type 1 and 2 Carbonaceous Chondrites," CI, CM, and CRI Geochimica et Cosmochimica Acta 137, 93-112, 2014.

Gertsch, L.S., et al., Laboratory Demonstration and Test of Solar Thermal Asteroid ISRU, funded NASA Early Stage Innovations Space Tech Research Grants, Proposed 2014, funded Jan. 2015.

Gertsch, R.E., et al., "Near Earth Resources," In Near Earth Objects, Annals of the New York Academy of Science, vol. 822, p. 468-510, 1997.

(56) References Cited

OTHER PUBLICATIONS

Gertsch, R.E., et al., "Mining near Earth resources," In Near Earth Objects, Annals of the New York Academy of Sciences, vol. 822, p. 511-537, 1997.

Gläser, P., et al., "Illumination conditions at the lunar poles: Implications for future exploration". Planetary and Space Science, in press, 2017, https://doi.org/10.1016/j.pss. 2017.07.006.

Goyal, R., et al., "Analytical study of tensegrity lattices for mass-efficient mechanical energy absorption", International Journal of Space Structures, 2018.

Goyal, R., et al., "Modeling of tensegrity structures", Journal of Open Source Software, 2019, vol. 4(42), pp. 1613.

Goyal, R., et al., "Tensegrity system dynamics with rigid bars and massive strings", Multibody System Dynamics, 2019, vol. 46(3) pp. 203-228.

Granvik et al., Abstract, IAU-Symposium: Complex Planetary Systems, Jul. 7-11, 2014, Namur, Belgium.

Granvik, M., et al., "The population of natural Earth satellites," Icarus, 2012.

Griffin, M.D., et al., "Space Vehicle Design, Second Edition (AIAA Education)", pp. 29-37, Feb. 23, 2004.

GRIP; Modeling and Simulation of Asteroid Capture Using a Deformable Membrane Capture Device; Proceedings of the ASME 2015 International Design Engineering Technical Conferences & Computers and Information in Engineering Conference; IDETC/CIE 2015; Aug. 2-5, 2015; Boston, USA; In 10 pages.

Grossman, G., et al., "Inflatable Concentrators for Solar Propulsion and Dynamic Space Power." Journal of Solar Energy Engineering, Nov. 1990, vol. 112/229.

Gural et al., 2022, Development of a very faint meteor detection system based on an EMCCD sensor and matched filter processing, Experimental Astronomy, 53:1085-1126.

Gural et al., Jul. 2018, Moving Object Detection using a Parallax Shift Vector Algorithm, Publ Astron Soc Pac, 130(989):074504, 30 pp.

Gural et al., Nov. 2003, Matched Filter Processing for Asteroid Detection in Cluttered Star Fields, Proceedings of the Core Technologies for Space Systems Conf., 17 pp.

Gural et al., Oct. 2003, Asteroid Search with Advanced Detection Algorithmsto Existing Asteroid Search Programs, NASA Center for AeroSpace Information (CASI) report ID# 20040021361, 18 pp.

Gural et al., Oct. 2005, Matched Filter Processing for Asteroid Detection, Astronomical Journal, 130:1951-1960.

Gural, 2016, Final Report and Recommendations for Asteroid Search Algorithms when Applied to the Low Earth Orbiting Asteroid Surveillance Satellite NEOSSat, Leidos contractual final report submitted to NASA HQ via Planetary Sciences Institute, 51 pp.

Harwood, William, "NASA's proposed asteroid retrieval mission outlined." Posted in Space Flight Now: Apr. 6, 2013. Available at https://spaceflightnow.com/news/n1304/06asteroid/.

Hayne, P. O., et al., "Evidence for exposed water ice in the Moon's south polar regions from Lunar Reconnaissance Orbiter ultraviolet albedo and temperature measurements". Icarus, 2015, vol. 255, pp. 58-69.

Hayne, P. O., et al., "Diviner Lunar Radiometer Observations of the LCROSS Impact", Science 330, 2010, pp. 477.

Heiken, G.H., et al., "Lunar sourcebook-a user's guide to the moon". NASA,. Cambridge, England, Cambridge University Press, 1991, vol. 753, pp No individual items are abstracted in this volume.

Interbartolo III. Michael A, et al., "Prototype Development of an Integrated Mars Atmosphere and Soil-Processing System", Journal of Aerospace Engineering, Jan. 2013, vol. 26(1), pp. 57-66.

Kutter, Bernard, "Transportation and Propellant Resources in the Cislunar Economy", Space Resources Roundtable XIX Planetary & Terrestrial Mining Sciences Symposium. http://www.isruinfo.com/index.php?page=srr_19_ptmss, 2018.

Lawrence, D. J., et al., "Evidence for water ice near Mercury's north pole from messenger Neutron Spectrometer measurements". Science 339, 2013, pp. 292-296.

Lewis, J.A., "Logistical Implications of Water Extraction from Near-Earth Asteroids," Proceedings of the Eleventh SSI-Princeton Conference, May 12-15, 1993.

Lewis, J.A., "Hard Choices for Manned Spaceflight: America as Icarus", http://csis.org/files/publication/140508_Lewis_HardChoicesMannedSpaceflight_Web.pdf, 2014.

Lewis; Mining the Sky; Untold Riches from the Asteroids, Comets, and Planets; Library of Congress Cataloging-in-Publication Data; ISBN 0-201-47959-1; 1996; 66 pages (pp. 7-11, 32, 49-74, 108-127, 134-141, 198-200).

Li, S. et al., "Possible detection of surface water ice in the lunar polar regions using data from the Moon Mineralogy Mapper (M3)," presented at LPSC XLVIII, Mar. 2017, Houston, TX.

Lunar Exploration Advisory Group "Commercial Lunar Propellant Architecture A Collaborative Study of Lunar Propellant Production", Final Report. Aug. 2018.

Masten, Jun. 17, 2021, Break the ice: Masten designs rocket mining system to extract lunar water, blog, 8 pp.

Mazanek et al., "Asteroid Retrieval Mission Concept—Trailblazing Our Future in Space and Helping to Protect Us from Earth Impactors." Planetary Defense Conference 2013, pp. 3, 5 [online] <URL: http://ntrs.nasa.gov/archive/nasa/casi.ntrs.nasa.gov/20130013170.pdf>.

Mazarico, E., et al., "Illumination Conditions of the Lunar Polar Regions Using LOLA Topography." Icarus, vol. 211, No. 2, 2011, pp. 1066-1081., doi: 10.1016/j.icarus. 2010.10.030.

Mohanty, Sep. 1981, Computer Tracking of Moving Point Targets in Space, IEEE Trans. Pattern Anal. Machine Intell., 3(5):606-611.

Mommert, M., et al., "Constraining the Physical Properties of Near-Earth Object 2009 BD," The Astrophysical Journal, vol. 786, No. 2.

Nagase, K., et al., "Minimal mass tensegrity structures", The International Association for Shell and Spatial Structures, 2014, vol. 55(1), pp. 37-48.

NASA Report from Office of the Chief Technologist, Emerging Space: The Evolving Landscape of 21st Century American Spaceflight, http://images.spaceref.com/docs/ 2014/Emerging_Space_Report.pdf.

NASA, "Asteroid Redirect Mission Reference Concept," 2013.

Norton, B., "Harnessing Solar Heat," Springer, pages C1-xiii, 39 and 48-73, ISBN 978-007-7275-5, 2013.

Pike R.J., "Crater dimensions from Apollo data and supplemental sources". The Moon, 1976, vol. 15, pp. 463-477.

Pike, R.J., "Depth/diameter relations of fresh lunar craters: Revision from spacecraft data", Geophysical Research Letters, 1974, vol. 1(7), pp. 291-294.

Pohlig, Jan. 16, 1992, Maximum Likelihood Detection of Electro-optic Moving Targets, MIT Technical Report 940, Lexington, MA, 58 pp.

Rapp, D., "Use of Extraterrestrial Resources for Human Space Missions to Moon or Mars (Springer Praxis Books / Astronautical Engineering)" published Nov. 20, 2012.

Reed et al., Jul. 1988, Optical moving target detection with 3-D matched filtering, IEEE Trans. Aerosp. Electron. Syst., 24(4):327-336.

Reinhold; A Solar Powered Station At A Lunar Pole; Feb. 18, 2021; https://theworld.com/~reinhold/lunarpolar.html; 7 pages.

Rimoli, J.J., et al., "Mechanical response of 3-dimensional tensegrity lattices", Composites Part B: Engineering, 2017, vol. 115, pp. 30-42.

Ross, Shane D., "Near-Earth Asteroid Mining", Caltech Space Industry Report, Dec. 14, 2001, Control and Dynamical Systems Caltech 107-81, Pasadena CA 91125 available at http://www2.esm.vt.edu/-sdross/papers/ross-asteroid-mining-2001.pdf.

Rostami, J., et al., "Lunar tunnel boring machines", In Earth and Space 2018: Engineering for Extreme Environments, American Society of Civil Engineers, pp. 240-252, 2018, Reston, VA.

Sabelhaus, A.P., et al. "Model-predictive control of a flexible spine robot", American Control Conference, 2017, IEEE, pp. 5051-5057.

Sanders, Oct. 10, 2019, NASA Lunar ISRU Strategy, presented at the What Next for Space Resource Utilization? Workshop, Luxembourg, 20 pp.

(56) References Cited

OTHER PUBLICATIONS

Sanders-Reed, 1998, Maximum likelihood detection of unresolved moving targets, IEEE Trans. Aerosp. Electron. Syst., 34(3):844-859.
Schlaich, M., "The messeturm in Rostock—A tensegrity tower", Journal of the International Association for Shell and Spatial Structures, 2004, vol. 45(2), pp. 93-98.
Sercel, "Demonstration of "Optical Mining" For Excavation of Asteroids and Production of Mission Consumables." NASA SBIR. Apr. 23, 7015 (Apr. 23, 2015), pp. 1-2, [online] <URL: http://sbir.nasa.gov/SBIR/abstracts/15/sbir/phase1/SBIR-15-1-H1 .01-9278.html>.
Sercel, Apr. 22, 2015, Worker Bees: thin-film solar thermal technology enables water-based cis-lunar transportation architecture, ICS Associates Inc., 109 pp.
Sercel, J.C., "Solar Thermal Propulsion for Planetary Spacecraft", presented at the JANNAF Propulsion Conference, San Diego, CA, Apr. 9-12, 1985.
Sercel, J.C., et al., "APIS(Asteroid Provided in-Situ Supplies): 100MT of Water, One Falcon 9 Launch" NIAC Phase 1a proposal submitted Nov. 2014.
Sercel, J.C., et al., "Emerging Space Office Grant (ESO)", "Stepping Stones: Economic Benefits of Asteroid Mining for Exploration of Deep Space" NASA Report, Contract No. NNX16AH11G, 2017.
Sercel; Time Dependent Finite Difference Modeling of Outgassing of Asteroids via Bulk Heating; 978-1-5386-2014-4/18/$31.00 © 2018 IEEE; I 14 pages.
Shao, M.B., et al., "Finding very Small Near-Earth Asteroids using Synthetic Tracking," Astrophysics J 782:1, 2014, arXiv, 1309.3248.
Shapiro, I and the Committee to Review Near-Earth Object Surveys and Hazard Mitigation Strategies. Final Report, National Research Council, National Academies Press, 2010.
Shoji, J. M., et al., "Solar Thermal Propulsion Status and Future", AIAA-92-1719, Aiaa Space Programs and Technologies Conference, Mar. 1992.
Skelton, R.E., Tensegrity Systems, 2009, Springer US.
Sowers et al., 2019, Ice mining in lunar permanently shadowed regions, New Space, 7(4):235-244.
Sowers, Jun. 12, 2018, Closing the Business Case for Lunar Propellant, PowerPoint presentation, 13 pp.
Spudis, P., et al., "Evidence for water ice on the moon: Results for anomalous polar craters from the Iro mini-rf imaging radar", Journal of Geophysical Research: Planets, 2013, vol. 118(10), pp. 2016-2029.
Squyres, S. and the NASA Advisory Council, Recommendation Regarding Mismatch Between NASA's Aspirations for Human Space Flight and Its Budget, from the Council Public Deliberation, Jul. 31, 2014.
Staugaitis, C., et al., "Mechanical and Physical Properties of the Echo II Metal-Polymer Laminate (NASA TND-3409)," NASA Goddard Space Flight Center, 1966.
Stoica, A. et al., "TransFormers of Extreme Environments and Their Integration in a Solar Power Infrastructure". AIAA SPACE 2016, AIAA SPACE Forum, 2016.
Stoica, A. et al., NIAC Phase II Final Report, Early Stage Innovation, NASA Innovative Advanced Concepts (NIAC), "TransFormers for Lunar Extreme Environments: Ensuring Long-Term Operations in Regions of Darkness and Low Temperatures", Nov. 2017.
Sultan, C., et al., "Deployment of tensegrity structures", International Journal of Solids and Structures, 2003, vol. 40(18), pp. 4637-4657.
Sunspiral, V., et al., "Tensegrity based probes for planetary exploration: Entry, descent and landing (edl) and surface mobility analysis", International Journal of Planetary Probes, 2013, vol. 7, pp. 13.
Taylor, G.J., "Using the Resources of the Moon to Expand Earth's Economic Sphere." Planetary Science Research Discoveries Report (2019): E205. Nov. 14, 2019 http://www.psrd.hawaii.edu/Nov19/PSRD-lunar-isru.pdf.
Thomas, M. et al., "Scaling Characteristics of Inflatable Paraboloid Concentrators", Presented at the Second ASME-JSES-JSME International Solar Energy Conference, Reno, Nevada, Mar. 17-22, 1991.
Tukkaraja, P., et al. Lunar mining and processing for in situ resource utilization, Earth and Space 2018: Engineering for Extreme Environments, American Society of Civil Engineers, 2018, pp. 401-413, Reston, VA.
Ulas et al., 2013, Numerical analysis of regenerative cooling in liquid propellant rocket engines, Aerospace Science and Technology 24(1):187-197.
Vasavada, A. R., et al., "Near-Surface Temperatures on Mercury and the Moon and the Stability of Polar Ice Deposits". Icarus, 1999, vol. 141, pp. 179-193.
Wihite, Alan, et al., Evolved Human Space Exploration Architecture Using Commercial Launch/Propellant Depots, 63rd International Astronautical Congress, Naples, Italy, 2012.
Yildiz, K., et al., "Effective beam stiffness properties of n-strut cylindrical tensegrity towers", AIAA Journal, 2019, vol. 57(5), pp. 2185-2194.
Yildiz, K., et al., "A novel deployment strategy for tensegrity towers", AlAA Spacecraft Structures Conference, 2018, pp. 0693.
Zacny; Asteroid Mining; AIAA SPACE 2013 Conference and Exposition Sep. 10-12, 2013, San Diego, CA; AIAA 2013-5304; in 16 pages.
Zegler, Frank, et al., "Evolving to a Depot-Based Space Transportation Architecture" AIAA Space 2010 Conference and Exposition. Aug. 30-Sep. 2, 2010, Anaheim, CA, AIAA 2010-8638.

\* cited by examiner

SYSTEMS AND METHODS FOR RADIANT GAS DYNAMIC MINING OF PERMAFROST

INCORPORATION BY REFERENCE TO ANY PRIORITY APPLICATIONS

This application is a continuation of U.S. patent application Ser. No. 17/448,349, filed Sep. 21, 2021, which is based upon and claims the benefit of priority from U.S. Provisional Patent Application No. 63/081,836 filed on Sep. 22, 2020. Moreover, any and all applications for which a foreign or domestic priority claim is identified in the Application Data Sheet as filed with the present application are hereby incorporated by reference under 37 CFR 1.57. The entire contents of each of the above-listed items is hereby incorporated into this document by reference and made a part of this specification for all purposes, for all that each contains.

BACKGROUND

The present disclosure relates to systems, methods, apparatus, and techniques for the in situ lunar or Martian removal of water from permafrost, e.g., for the purpose of generating propellants.

SUMMARY OF CERTAIN INVENTIVE ASPECTS

Aspects of this disclosure relate to a method for mining lunar polar permafrost to extract gas propellants, comprising: providing a rover vehicle for mining permafrost from a landing site, the rover vehicle configured to combine radio frequency (RF), microwave, and infrared radiation to heat the permafrost at a depth control heating profile; lowering a dome from the rover vehicle to a surface of the landing site, the dome having a conformable skirt configured to increase gas collection efficiency and a plurality of infrared heaters configured to warm the surface of the mining location, the interior surface of the skirt having arranged thereon a plurality of phased wire dipole antennas arranged in a plurality of broadside arrays; deploying from the rover vehicle a plurality of drilling devices configured to enable subsurface RF heating; sublimating ice at a predetermined depth, using a combination of radiation sources, to cause water vapor to migrate upward and out of the permafrost; using a rotating belt to capture cryogenic vapors; and storing the vapor as a liquid in one or more water storage tanks.

In some embodiments, the plurality of phased wire dipole antennas for each of the broadside arrays are connected by a plurality of wire transmission lines to a common feed point.

In some embodiments, each of the wire transmission lines has a length that is about one-half of an operating wavelength.

In some embodiments, each of the plurality of phased wire dipole antennas has a length that is about one-half of an operating wavelength.

In some embodiments, the length of each of the plurality of phased wire dipole antennas is about 6 cm.

In some embodiments, each of the broadside arrays comprises a plurality of arrays of sixteen of the plurality of phased wire dipole antennas.

In some embodiments, each of the broadside arrays comprises five arrays of sixteen of the plurality of phased wire dipole antennas.

In some embodiments, each of the broadside arrays is configured to project a focused microwave beam into the surface of the landing site to aid in the sublimation of the ice.

In some embodiments, the method further comprises a microwave source connected to each of the broadside arrays via a corresponding parallel wire transmission line.

In some embodiments, the method further comprises a plurality of shunting device configured to improve coupling efficiency between the microwave source and the broadside arrays.

In some embodiments, the plurality of broadside arrays are configured to produce microwave beams that overlap in a region below the surface of the landing site.

Another aspect includes a rover vehicle for mining permafrost, comprising: a dome configured to be lowered from the rover vehicle to a surface of a landing site, the dome having a conformable skirt configured to increase gas collection efficiency and a plurality of infrared heaters configured to warm the surface of the mining location, the interior surface of the skirt having arranged thereon a plurality of phased wire dipole antennas arranged in a plurality of broadside arrays; a plurality of drilling devices configured to be deployed to enable subsurface radio frequency (RF) heating; a rotating belt configured to capture cryogenic vapors sublimated from ice at a predetermined depth within the landing site using a combination of radiation sources; and one or more water storage tanks configured to store the vapor as a liquid.

In some embodiments, the rover vehicle further comprises: a plurality of wire transmission lines configured to connect the plurality of phased wire dipole antennas for each of the broadside arrays to a common feed point.

In some embodiments, each of the wire transmission lines has a length that is about one-half of an operating wavelength.

In some embodiments, each of the plurality of phased wire dipole antennas has a length that is about one-half of an operating wavelength.

In some embodiments, the length of each of the plurality of phased wire dipole antennas is about 6 cm.

In some embodiments, each of the broadside arrays comprises a plurality of arrays of sixteen of the plurality of phased wire dipole antennas.

In some embodiments, each of the broadside arrays comprises five arrays of sixteen of the plurality of phased wire dipole antennas.

In some embodiments, each of the broadside arrays is configured to project a focused microwave beam into the surface of the landing site to aid in the sublimation of the ice.

In some embodiments, the rover vehicle further comprises a microwave source connected to each of the broadside arrays via a corresponding parallel wire transmission line.

In some embodiments, the rover vehicle further comprises a plurality of shunting device configured to improve coupling efficiency between the microwave source and the broadside arrays.

In some embodiments, the plurality of broadside arrays are configured to produce microwave beams that overlap in a region below the surface of the landing site.

DETAILED DESCRIPTION

Aspects of this disclosure relate to a shadowed polar ice (SPICE) harvester which can be used an in situ dome. Radian Gas Dynamic (RGD) mining uses a combination of microwave, radio frequency (RF), and infrared or optical heating inside an insulated dome that can be carried on a rover along with vapor capture equipment and water tanks. A rigid dome can be heated on the interior and insulated to prevent heat loss and water collection in unwanted locations. Aspects of this disclosure further describe testing apparatus and methods (e.g., cryo shroud, cryogenic vacuum, and valve and seal cycle testing) to prepare for delivery and deployment of such systems. Some dome embodiments use a 5 kW S-band magnetron power supply for 100 kg class water harvesting and a continuous flow cryobelt.

Rover Vehicle with Microwave Focusing Panels

Figure 1A:
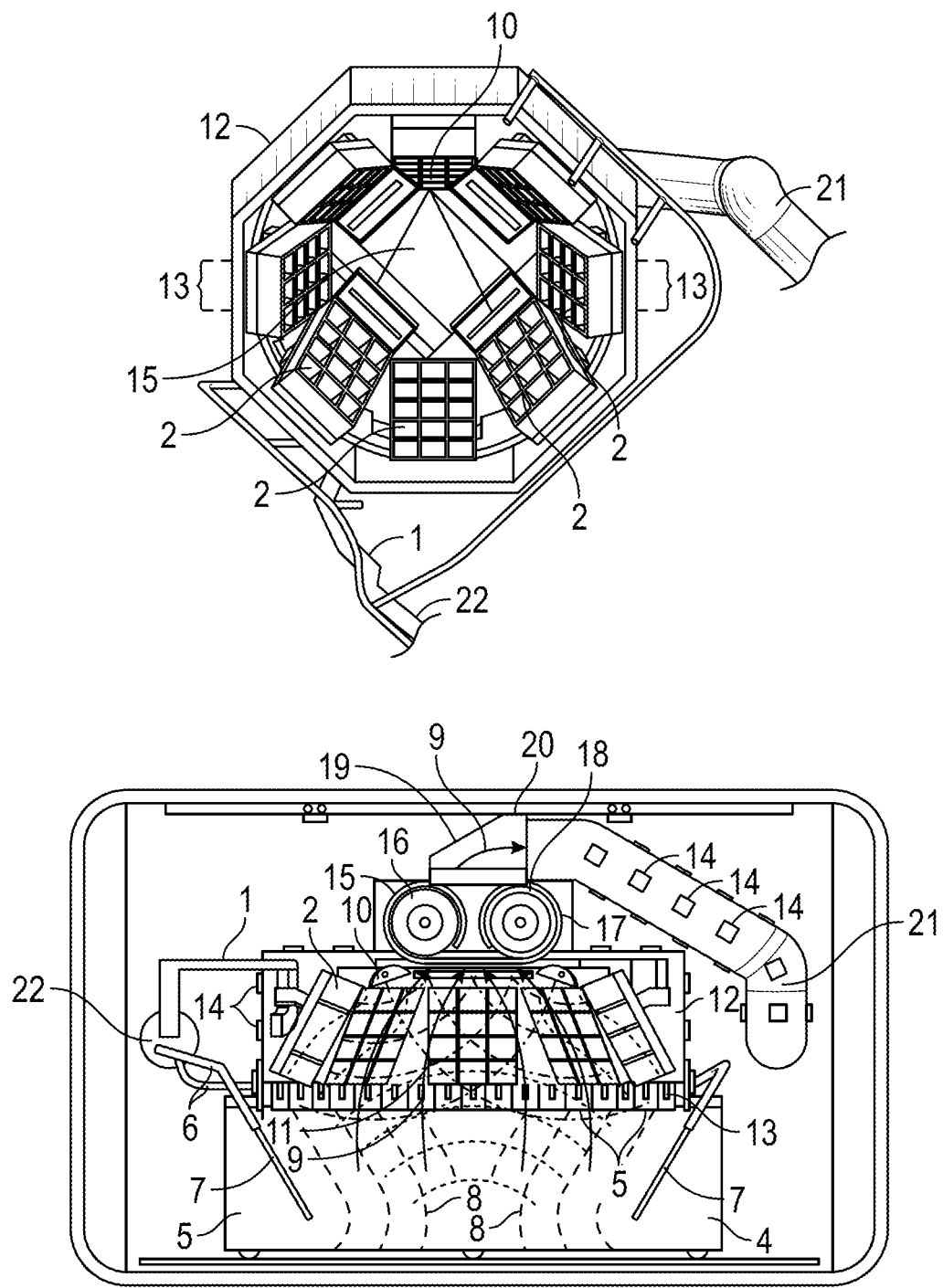
FIGS. 1A and 1B are schematic illustrations of an embodiment of an apparatus or system for implementing RGD mining, including the use of radiant gas dynamic (RGD) mining implemented in a large scale rover design.
Figure 1B:
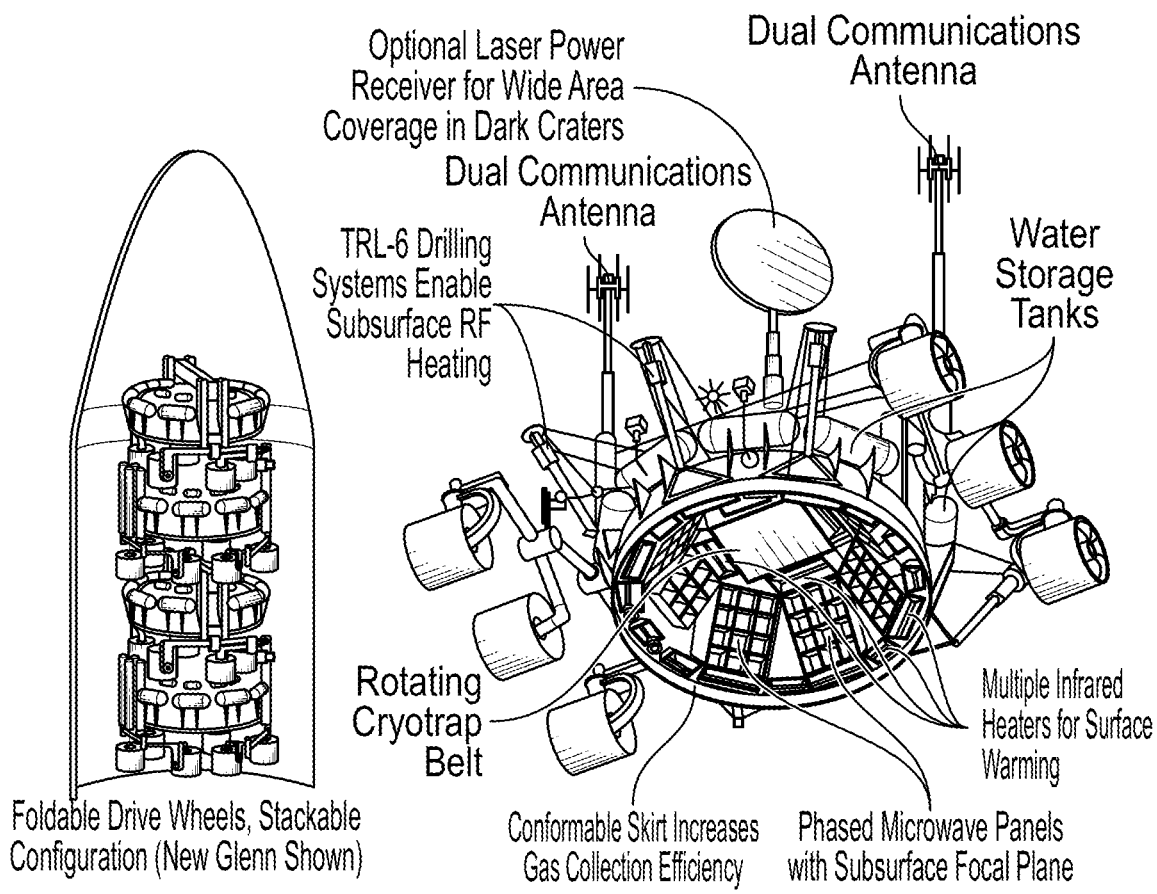
Figure 1B:
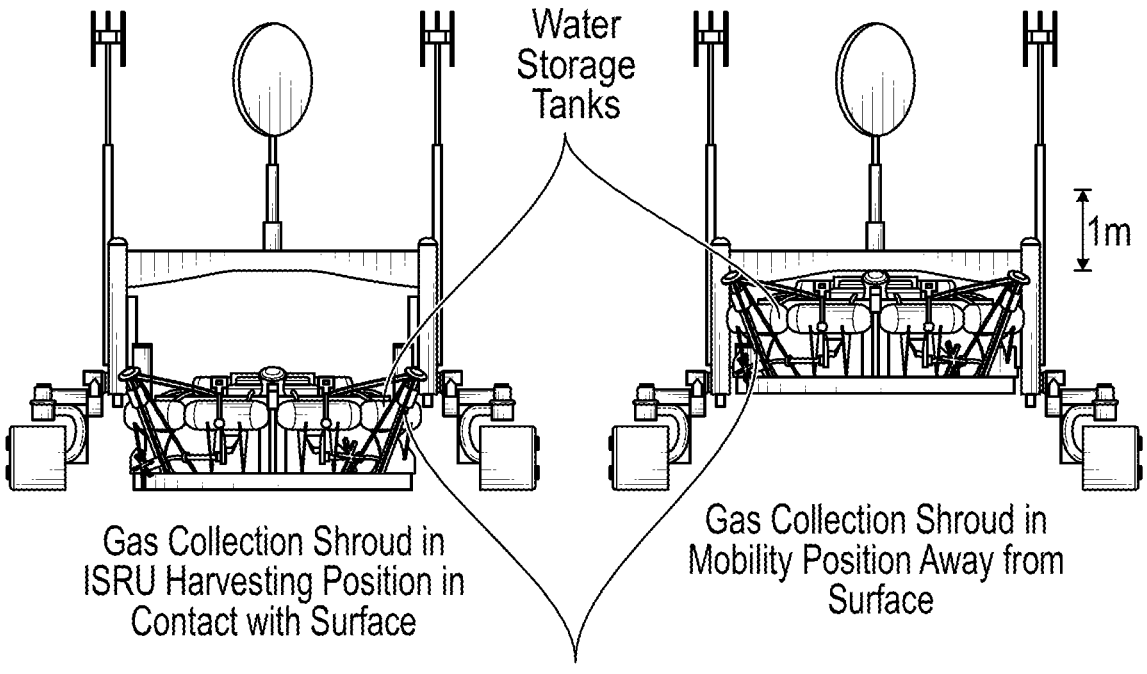

With reference to FIGS. 1A and 1B, the various features of one embodiment of an RGD mining apparatus and system will be described. These features may be incorporated into a roving vehicle or other mining apparatus or system. In this embodiment, with reference to FIG. 1A, the upper illustration shows the bottom perspective view of the dome structure of the mining apparatus, while the lower illustration is a side view. The various components illustrated in FIG. 1A are as follows:

1. Microwave Waveguide Network
2. Focusing Microwave Panels (Eight)
3. Microwave Wavefronts
4. Simulated Regolith or Permafrost
5. Simulated Surface Roughness
6. High Power RF Coax Cables
7. RF Dielectric Heating Probes (Six)
8. RF Wavefronts
9. Sublimated Water Vapor
10. Radiant Infrared Heaters (Four)
11. Infrared Radiation
12. Gas Directing Dome Structure
13. Surface Conforming Skirt Mechanism
14. Resistive Patch Heaters (Many)
15. Stainless Steel Cryobelt
16. Liquid Nitrogen Cooled Rotary Drum
17. Water Vapor Collected as Frost
18. Direction of Rotation
19. Follower Closures
20. Cryobelt Radiant Heater
21. Roughing Pump Duct
22. Vacuum System Port With reference to FIG. 1B, the upper left illustration shows a rover design in which foldable drive wheels and a stackable design allow the rover to be integrated as a payload in a space craft, such as the New Glenn. The upper right illustration shows a bottom perspective view of the unfolded, deployed rover, including the dome structure, while the lower two illustrations show two side views with the dome lowered to contact the surface and raised away from the surface.

The dome is configured to support the eight microwave focusing panels, also referred to as waveguide slotted arrays (WGSA); the power divider waveguide network; the Cryobelt vapor collection assembly; and the skirt assembly that reduces the area for volatiles to escape at an efficiency level modeled and accounted for in Table 1 of US Patent Application Publication No. 2020/0240267. The design of the embodiments of FIGS. 1A and 1B can be an assembly based on readily-obtainable materials and processes to the greatest extent possible. Materials are preferably functional at cryogenic temperatures. The skirt assembly can avoid cyclic flexing and associated fatigue risk. Preferably, the skirt assembly also provides that any leakage area between the dome and the mined surface (e.g., lunar or Martian surface) be much less than the cryopump area. Preferred structures of the dome can have multiple surfaces (e.g., have an octagonally shape) and a sufficiently supportive and protective design (e.g., aluminum walls). For example, preferred deisngs surround and supports the eight WGSAs and the power divider network as shown in FIGS. 1A and 1B.

Figure 2:
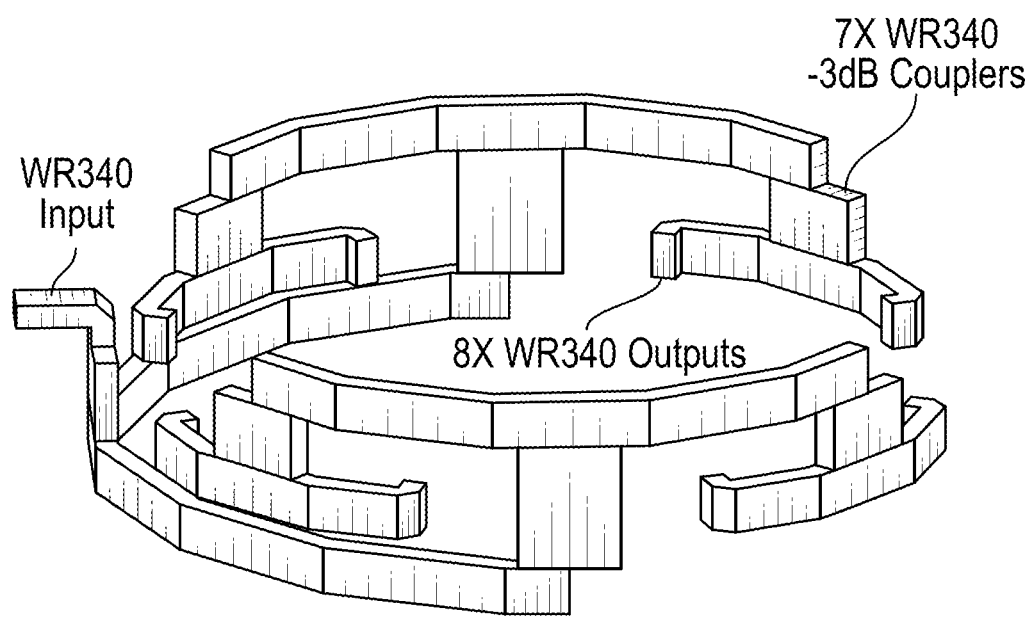
FIG. 2 is an illustration of one embodiment of a cylindrically oriented 1 to 8 waveguide power dividing network which splits power from the magnetron to the 8 WGSA focusing panels which direct the power into the permafrost.

With reference to FIG. 2, in some embodiments the arrays and the waveguide used in the power divider network are dip brazed Aluminum structures using COTS WR340 waveguide components and dimensions. Preferred embodiments of the antennae and the waveguides are sized to operate in the TE10 mode. Waveguide straight sections and bends can be dip brazed together into individual pieces, and individual pieces can be attached together using standard waveguide bolted flanges. A view of an example divider assembly is also shown in FIG. 2.

A microwave design that can be used with the described structures comprises a multi-sided (e.g., octagonal) array comprising elements in the near field of each other as shown in FIG. 1A. The electro-magnetic fields radiating from the elements can be focused slightly below a mined surface (e.g., within a ~0.03 m³ volume approximately 20 cm below a mined surface, such as of the moon or mars). In some embodiments, the rectangular waveguide elements are spaced one-half wavelength apart. In the illustrated embodiment, the rectangular waveguide elements are square (e.g., 12×12 cm square) and can be excited by a TE10 mode with a given complex amplitude. The array can comprise multiple (e.g., eight) rectangular arrays (e.g., 3×4 arrays) of these square, open-ended waveguide elements that are tilted downward at about 15 degrees to facilitate focusing of the beam as shown in FIGS. 1A and 1B.

Apertures can be located at the ends of lenses (which can comprise phase shifters used to adjust the phase for each element). WGSAs with lenses can thus be used to good effect. Associated complex amplitude and phase coefficients are configured to be adjusted using a conjugate phase approach. To determine the focusing capability with the conjugate phase approach, the fields can be computed on a plane below the array (e.g., 20 cm below) as the array can be "focused" at different points along the Z-axis of the array. Phase shifting of the multiple (e.g., 8) panels can effectively direct the microwave energy down and toward the center of the system. The power density profile suggests that the focusing system can deliver nearly all 15 kW into a small region. Such a focusing process can help improve heating at given depth, thereby driving vapor upward into the dome system.

At least two microwave frequencies, 915 MHz (L-Band) and 2.45 GHz (S-Band), are well suited for penetrating and volume heating of soils. Terrestrial uses of these frequencies include cooking, curing, and drying of agricultural and many manufactured products. Magnetrons can be used as power sources in these two bands because of their high electrical efficiency. DC to microwave conversion efficiency using magnetrons are about 80% at S-band and 90% at L-Band. L-Band commercial magnetron sources are available at continuous output power levels up to 140 kW. At 2.45 GHz, the highest power tube currently available can produce 15 kW of continuous output power. In certain embodiments, a 6 kW S-Band microwave system with magnetron, autotuner and waveguide feed system has been shown to be effective. In another embodiment, a 15 kW system is proposed.

Moving from microwave design to mechanical design, the skirt assembly can include 96 PTFE (Teflon) U-channels attached to the wall of the dome with two flathead screws each, through slots symmetrically located about the center and long enough to absorb the relative movement due to the delta CTE between the wall and the channel. In some embodiments, 48 movable skirt segments can each be 10 cm wide by 30 cm tall by 0.5 cm thick and can slide +/−6 centimeters up and down, guided by the U-channel. Skirt segments can be notched along a portion of their height to create captive features, and the fastener centered along the U-channel height can act as a stop preventing the skirt segments from sliding out of the U-channels.

In summary, FIGS. 1A, 1B, and 2 illustrate an embodiment of a rover vehicle with eight microwave focusing panels that are further described as waveguide slotted arrays (WGSA). A focused converging microwave beam can be projected downward from the rover dome into lunar regolith. The microwave beam is used to heat the frozen regolith in order to melt and volatize frozen water or other trapped volatile chemicals. The liberated vapors are collected on a cryobelt as part of the vapor collection system.

Wire Antenna Dipoles for Rover Vehicles

Figure 3A:
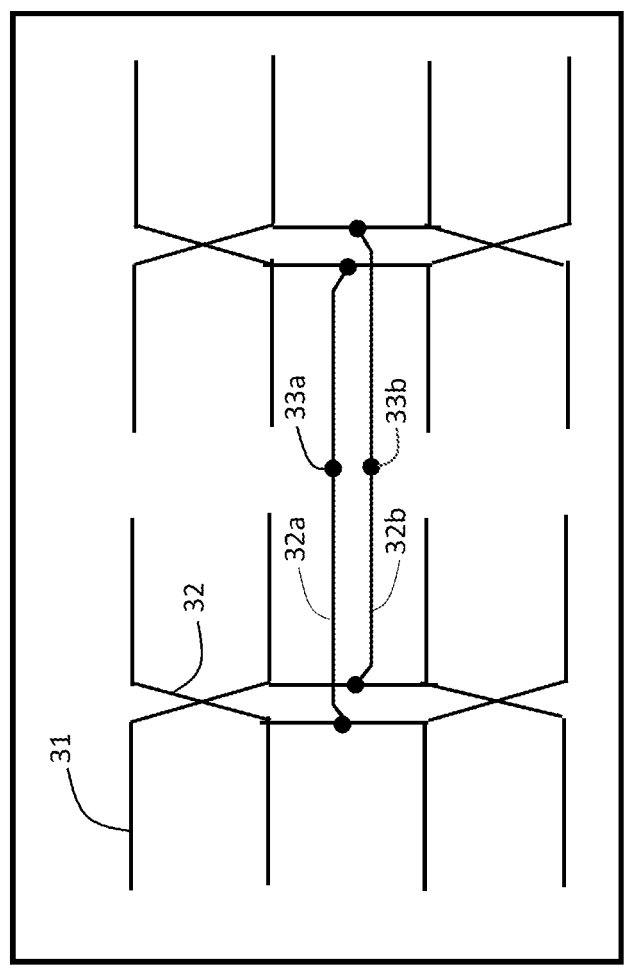
FIGS. 3A and 3B illustrates the basic configuration of a dipole array in accordance with aspects of this disclosure.
Figure 3B:
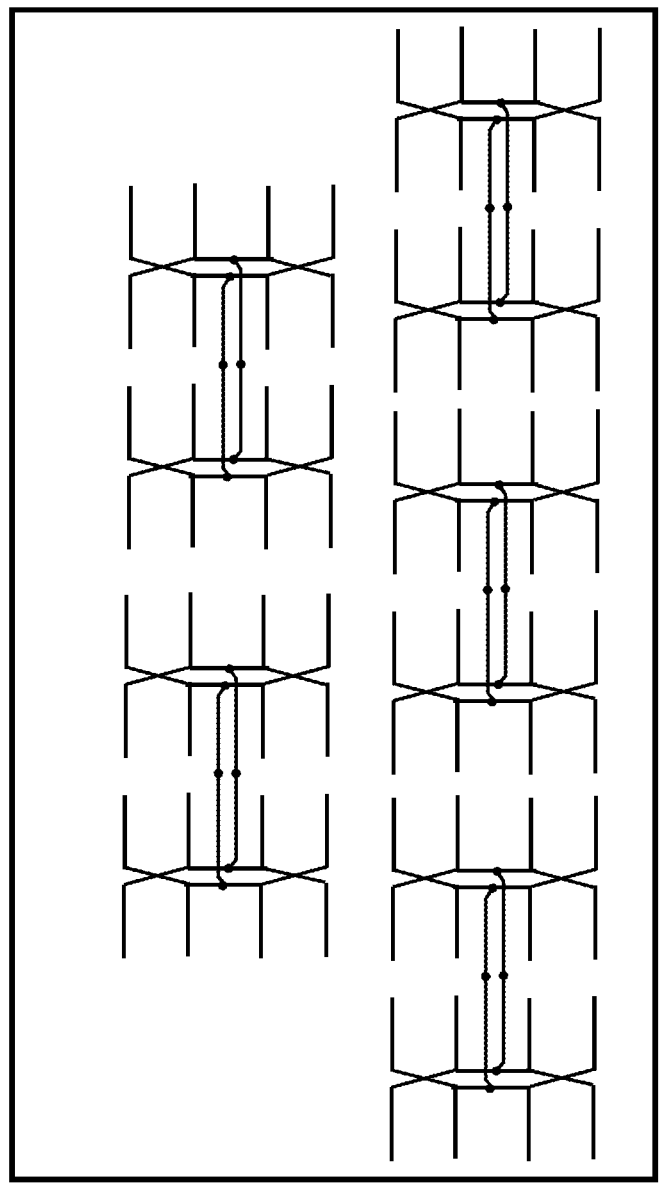
Figure 4:
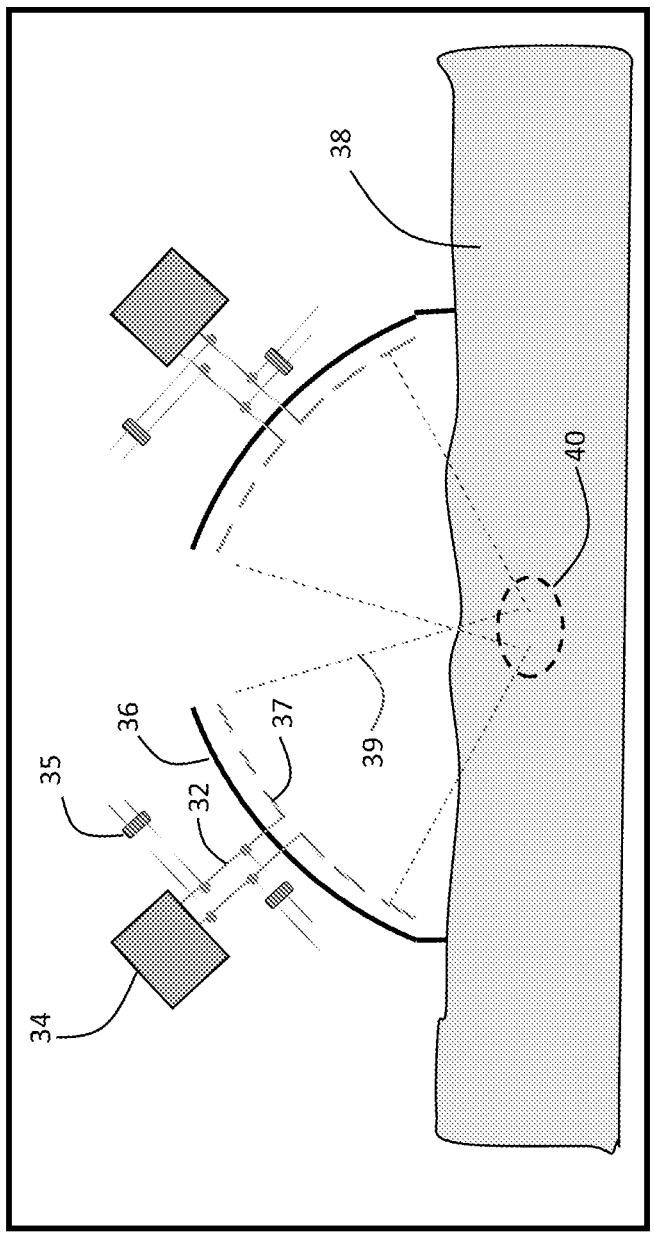
FIG. 4 illustrates the installation of a plurality of 40-element dipole arrays which are curved and installed along the inner surface of a spherical rover dome in accordance with aspects of this disclosure.

Another embodiment of the present disclosure is illustrated schematically in FIGS. 3A, 3B, and 4. In these embodiments, the WGSA panels and associated waveguide phasing networks have been replaced by a broadside phased array of dipole antennas. FIGS. 3A and 3B illustrate the basic configuration of a dipole array in accordance with aspects of this disclosure. Waveguides of the embodiment of FIGS. 1A, 1B, and 2 have been replaced by lighter and smaller wire antennas that are connected by open-wire transmission lines.

FIG. 3A illustrates an array of 16 wire dipole antennas is connected by wire transmission lines to a common feed point in accordance with aspects of this disclosure. Referring to FIG. 3A, a plurality of wire antenna dipoles 31 are about one-half wavelength long at the microwave operating wavelength. For the common microwave frequency of 2.45 GHz, the dipoles are approximately 6 cm in length. Each of the dipole antennas 31 is connected at one of its ends by a wire transmission line segment 32 which is also about one-half wavelength long. The various dipoles 31 are connected by 2-wire transmission lines 32a and 32b to common feed points 33a and 33b. The interconnected dipoles 31 of FIG. 1A constitute a basic array of 16 dipoles which can radiate a microwave beam in the broadside direction (e.g., out of the page).

FIG. 3B illustrates five arrays of 16 dipole antennas connected between their common feed points to produce a broadside array of 40 dipoles in accordance with aspects of this disclosure. That is, FIG. 3B illustrates how the basic broadside arrays of FIG. 3A may be combined into larger arrays. In the particular embodiment of FIG. 3B, the larger array comprises an array of 40 dipoles. The illustrated array measures approximately 50 cm wide by 40 cm high in certain embodiments.

FIG. 4 illustrates the installation of a plurality of 40-element dipole arrays which are curved and installed along the inner surface of a spherical rover dome in accordance with aspects of this disclosure. With reference to FIG. 4, the 40-element dipole arrays 37 may be installed on the inner spherical surface of a rover dome 6. The plurality of dipole arrays can be used to project powerful focused microwave beams into the lunar regolith. The region below the surface is heated by the focused microwave beams, which drives volatile gases upwards to be collected (e.g., by rover cryotraps).

In this figure, a high-power microwave source 34 is connected to the array 37 by a parallel wire transmission line 32. A plurality of shunt tuning devices 35 can be adjusted for maximum (or to improve) coupling efficiency of microwave power between the source 34 and the antenna array 37. Each of the antenna arrays 37 launches a converging microwave beam 39 into the lunar regolith 38. The multiple converging beams 39 overlap in a region 40 below the surface of the regolith. The heated region 40 then drives volatile gases upwards to be collected by the rover cryotraps.

In this manner, the dipole broadside arrays 37 can deliver the same subsurface heating performance as the waveguide slotted arrays (WGSA) of FIGS. 1A, 1B, and 2 but with a lower weight and a more volumetrically compact design. The savings in weight and volume increase proportionally for larger rover domes and for microwave sources with longer wavelength.

What is claimed is:

1. A method for mining permafrost of a landing site, comprising:
   providing a rover vehicle for mining permafrost from a landing site;
   lowering a dome from the rover vehicle to a surface of the landing site, the dome having a skirt with an interior surface having arranged thereon a plurality of phased wire dipole antennas, each of the plurality of phased wire dipole antennas configured to generate a microwave beam to heat the surface of the landing site to sublimate ice within the landing site, wherein the plurality of phased wire dipole antennas are arranged such that each of the microwave beams converges at a region below the surface of the landing site;
   sublimating ice within the landing site using the plurality of phased wire dipole antennas;
   capturing cryogenic vapors sublimated from the ice within the landing site using a vapor collector of the rover vehicle; and
   storing the vapor in one or more storage tanks of the rover vehicle as a liquid.

2. The method of claim 1, wherein the plurality of phased wire dipole antennas are connected by a plurality of wire transmission lines to a common feed point.

3. The method of claim 2, wherein each of the wire transmission lines has a length that is about one-half of an operating wavelength.

4. The method of claim 1, wherein each of the plurality of phased wire dipole antennas has a length that is about one-half of an operating wavelength.

5. The method of claim 4, wherein the length of each of the plurality of phased wire dipole antennas is about 6 cm.

6. The method of claim 1, wherein the phased wire dipole antennas are arranged into a plurality of broadside arrays.

7. The method of claim 6, wherein each of the broadside arrays comprises five arrays of sixteen of the plurality of phased wire dipole antennas.

8. The method of claim 6, wherein each of the broadside arrays is configured to project a focused microwave beam into the surface of the landing site to aid in the sublimation of the ice.

9. The method of claim 6, further comprising a microwave source connected to each of the broadside arrays via a corresponding parallel wire transmission line.

10. The method of claim 9, further comprising a plurality of shunting device shunt tuning devices configured to tune coupling efficiency between the microwave source and the broadside arrays.

11. A rover vehicle, comprising:
a dome configured to be lowered from the rover vehicle to a surface of a working site, the dome having a skirt with an interior surface having arranged thereon a plurality of phased wire dipole antennas, each of the plurality of phased wire dipole antennas configured to generate a microwave beam to heat the surface of the working site to sublimate ice within the working site, wherein the plurality of phased wire dipole antennas are arranged such that the microwave beams converge at a region below the surface of the working site;
a vapor collector configured to capture cryogenic vapors sublimated from the ice within the working site; and
one or more storage tanks configured to store the vapor as a liquid.

12. The rover vehicle of claim 11, further comprising:
a plurality of wire transmission lines configured to connect the plurality of phased wire dipole antennas to a common feed point.

13. The rover vehicle of claim 12, wherein each of the wire transmission lines has a length that is about one-half of an operating wavelength.

14. The rover vehicle of claim 11, wherein each of the plurality of phased wire dipole antennas has a length that is about one-half of an operating wavelength.

15. The rover vehicle of claim 14, wherein the length of each of the plurality of phased wire dipole antennas is about 6 cm.

16. The rover vehicle of claim 11, wherein the phased wire dipole antennas are arranged into a plurality of broadside arrays.

17. The rover vehicle of claim 16, wherein each of the broadside arrays comprises five arrays of sixteen of the plurality of phased wire dipole antennas.

18. The rover vehicle of claim 16, wherein each of the broadside arrays is configured to project a focused microwave beam into the surface of the working landing site to aid in the sublimation of the ice.

19. The rover vehicle of claim 16, further comprising a microwave source connected to each of the broadside arrays via a corresponding parallel wire transmission line.

20. The rover vehicle of claim 19, further comprising a plurality of shunt tuning devices configured to tune a coupling efficiency between the microwave source and the broadside arrays.

* * * * *